(12) United States Patent
Perraud

(10) Patent No.: US 12,010,094 B2
(45) Date of Patent: Jun. 11, 2024

(54) METHOD FOR FILTERING ATTACK STREAMS TARGETTING A CONNECTIVITY MODULE

(71) Applicants: RENAULT s.a.s., Boulogne-Billancourt (FR); NISSAN MOTOR CO., LTD., Yokohama (JP)

(72) Inventor: Eric Perraud, Plaisance du Touch (FR)

(73) Assignees: RENAULT s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 676 days.

(21) Appl. No.: 17/048,428

(22) PCT Filed: Apr. 4, 2019

(86) PCT No.: PCT/EP2019/058477
§ 371 (c)(1),
(2) Date: Oct. 16, 2020

(87) PCT Pub. No.: WO2019/201609
PCT Pub. Date: Oct. 24, 2019

(65) Prior Publication Data
US 2021/0168119 A1    Jun. 3, 2021

(30) Foreign Application Priority Data
Apr. 17, 2018 (FR) ........................ 1853343

(51) Int. Cl.
*G06F 21/00* (2013.01)
*H04L 9/40* (2022.01)
*H04L 43/16* (2022.01)

(52) U.S. Cl.
CPC .......... *H04L 63/0227* (2013.01); *H04L 43/16* (2013.01); *H04L 63/1425* (2013.01); *H04L 63/1458* (2013.01); *H04L 2463/141* (2013.01)

(58) Field of Classification Search
CPC . H04L 63/0227; H04L 43/16; H04L 63/1425; H04L 63/1458; H04L 2463/141; G06F 21/55
See application file for complete search history.

(56) References Cited

U.S. PATENT DOCUMENTS 8,544,087 B1    9/2013 Eskin et al.
9,843,596 B1 *  12/2017 Averbuch .............. G06F 21/554
(Continued)

OTHER PUBLICATIONS

Sui Song, Li Ling and C. N. Manikopoulo, "Flow-based Statistical Aggregation Schemes for Network Anomaly Detection," 2006 IEEE International Conference on Networking, Sensing and Control, Ft. Lauderdale, FL, USA, 2006, pp. 786-791, doi: 10.1109/ICNSC.2006.1673246. (Year: 2006).*
(Continued)

*Primary Examiner* — Michael M Lee
(74) *Attorney, Agent, or Firm* — Oblon, McClelland, Maier & Neustadt, L.L.P.

(57) ABSTRACT

A method for filtering attack streams targeting a connectivity module receiving a plurality of incoming connection streams includes: determining a plurality of aggregates; determining a plurality of first measurement vectors; determining another aggregate resulting from the combination of a plurality of incoming connection streams during another time period; determining another first measurement vector associated with the other aggregate; determining an abnormality score depending on the result of projecting the other first measurement vector and projecting the plurality of first measurement vectors and then, if the abnormality score is comprised in an area of doubt regarding the presence of an attack stream determining a plurality of second measurement vectors, each associated with one of the aggregates; determining another second measurement vector associated
(Continued)

with the other aggregate; and detecting the presence or absence of an attack by analysing the other second measurement vector.

7 Claims, 3 Drawing Sheets

(56) References Cited

U.S. PATENT DOCUMENTS

| | | | |
|---|---|---|---|
| 10,749,883 B1* | 8/2020 | Martin | G06F 21/554 |
| 2010/0034102 A1* | 2/2010 | Wang | H04L 41/0893 |
| | | | 370/252 |
| 2016/0226901 A1* | 8/2016 | Baikalov | H04L 63/1425 |
| 2016/0328654 A1* | 11/2016 | Bauer | G06F 18/24 |
| 2017/0134401 A1 | 5/2017 | Medvedovsky et al. | |
| 2017/0257388 A1* | 9/2017 | Addepalli | G06N 20/00 |
| 2018/0241762 A1* | 8/2018 | Savalle | G06N 3/006 |
| 2019/0188212 A1* | 6/2019 | Miller | H04L 63/145 |

OTHER PUBLICATIONS

International Search Report dated May 2, 2019 in PCT/EP2019/058477, 2 pages.
Pedro Casas, et al., "UNADA: Unsupervised Network Anomaly Detection Using Sub-Space Outliers Ranking" HAL Archives—Ouvertes, Springer International Publishing, vol. 6640, 032682, XP055544974, Jan. 1, 2011, 13 pages.
Wei Wang, et al., "Autonomic Intrusion Detection: Adaptively Detecting Anomalies over Unlabeled Audit Data Streams in Computer Networks" Knowledge-Based Systems, vol. 70, XP055339858, Nov. 1, 2014, 29 pages.

* cited by examiner

METHOD FOR FILTERING ATTACK STREAMS TARGETTING A CONNECTIVITY MODULE

TECHNICAL FIELD TO WHICH THE INVENTION RELATES

The present invention generally relates to the protection of connectivity modules from denial-of-service attacks.

It more particularly relates to a method for filtering attack flows targeting a connectivity module receiving a plurality of connection inflows.

It also relates to a device for filtering such an attack flow.

TECHNOLOGICAL BACKGROUND

Denial-of-service attacks (DoS attacks) and distributed denial-of-service attacks (DDoS attacks) are cyber-attacks the aim of which is to make a service of an attacked site unavailable. It is not a question in the context of these attacks of corrupting the data of the attacked site.

These attacks are able to target any server-linked connectivity module, and in particular any Internet-server-linked connectivity module.

The connectivity module of a motor vehicle is generally connected to a private network of the manufacturer. However, in order to improve in particular driver-assistance systems or to propose a wider range of choice in a provided multimedia offering, it is envisioned to connect the connectivity module of a motor vehicle to a public Internet network. In this case, the connectivity module will be exposed to various attacks, and in particular to distributed denial-of-service attacks.

A machine-learning method used to detect potential attacks targeting a connectivity module, i.e. a piece of network equipment such as for example a server or a router, is known. The known method was developed for important pieces of network equipment that receive an infinite number of incoming and outgoing connections. This method aims to classify the incoming Internet flows (or IP flows, IP being the acronym of Internet protocol) into legitimate flows and attack flows.

To do this, the method is based on the graphical distribution of parameters characterizing the incoming flows in a plurality of sub-spaces. A sub-space is defined by the graphical zone delineated by two parameters characterizing an inflow. It may for example be a question of a graph showing the average lifetime of a request (the remainders of the IP packets) as a function of the number of connection-flow sources.

Under nominal conditions the parameters of the inflow congregate graphically into a cluster about one operating point, whereas in case of attack the parameters of the attack flows have aberrant values and congregate graphically about isolated points or outliers.

In the known method, the plurality of connection inflows is aggregated, in a given time period, by source address. The various aggregated flows are then analyzed and if an attack is detected (by the presence of at least one aberrant value), the inflow identified as illegitimate is filtered at once by virtue of the great computing capacities of the processors involved.

This method is effective in the case of network equipment connected to the public Internet network (typically servers), because the plurality of connection inflows or outflows consists of a very high number of connections allowing reliable statistics to be extracted and because the processors used to perform the processing are powerful. As an attack generally results in a number of connection inflows that is low with respect to the total number of connection inflows, distinction between clusters and aberrant values is possible and works well.

In contrast, a connectivity module of a motor vehicle is suitable for receiving only a limited number of incoming connections (in general about ten connections). During the analysis of inflows, legitimate flows would thus be drowned out in the attack flows and the latter would appear as a cluster (and therefore as the nominal conditions) and no longer as aberrant values. The solution described above can therefore not be applied to the protection of a connectivity module of a motor vehicle.

SUBJECT OF THE INVENTION

The present invention proposes to improve the detection of attacks targeting connectivity modules, in particular in the case of a connectivity module comprised in a motor vehicle.

More particularly, according to the invention, a method for filtering attack flows such as defined in the introduction is proposed, the method comprising steps of:
  determining a plurality of aggregates, each aggregate resulting from the combination of the plurality of connection inflows received during a predefined time period, said time period considered to determine each aggregate being different from that considered to determine the other aggregates, and the time periods considered to determine the plurality of aggregates all being comprised in a first observation time window,
  determining a plurality of first measurement vectors that are each associated with one of said aggregates and that contain values of first characteristic parameters of the aggregate with which it is associated,
  projecting the plurality of first measurement vectors into at least one sub-space defined by said first characteristic parameters,
  determining another aggregate resulting from the combination of a plurality of connection inflows received during another time period, said other time period following the first observation time window,
  determining another first measurement vector that is associated with the other aggregate and that contains values of first characteristic parameters of the other aggregate,
  projecting the other first measurement vector into at least one sub-space defined by said first characteristic parameters,
  determining an abnormality score depending on the result of the projection of the other first measurement vector and of the projection of the plurality of first measurement vectors,
  then, if the abnormality score is comprised in a zone of doubt as to the presence of attack flows:
  determining a plurality of second measurement vectors that are each associated with one of said aggregates and that contain values of other characteristic parameters of the aggregate with which it is associated, said other characteristic parameters being distinct from said first characteristic parameters,
  determining another second measurement vector that is associated with the other aggregate and that contains values of other characteristic parameters of the other aggregate, and
  detecting the presence or absence of an attack by analyzing the other second measurement vector.

Thus, according to the invention, attack flows are detected in a plurality of distinct phases of implementation thus limiting the computational power required to execute these phases. This implementation may therefore be implemented by processes that are not very powerful, such as those integrated into a connectivity module of a vehicle.

In addition, the use of a second measurement vector, defined depending on other characteristic parameters that are distinct and independent from the characteristic parameters usually used, allows the conclusion obtained as to the presence or absence of an attack targeting the connectivity module of the vehicle to be validated.

The following, which may be implemented individually or in any technically possible combination, are other non-limiting and advantageous features of the method for filtering attack flows according to the invention:

- to determine whether the abnormality score is comprised in a zone of doubt as to the presence of attack flows, provision is made to compare the abnormality score to a first threshold and to a second threshold;
- provision is made to compare the abnormality score with a second threshold, and if the abnormality score is higher than the second threshold, the presence of an attack is detected in the other time period;
- provision is made to compare the abnormality score with a first threshold, and if the abnormality score is lower than the first threshold, the absence of an attack is detected in the other time period;
- provision is also made for the following steps:
  - defining a second observation time window, said second observation time window corresponding to the first observation time window shifted by the other time period,
  - determining a new aggregate, the new aggregate resulting from the combination of the plurality of connection inflows received during a new time period, said new time period following the second observation time window,
  - determining a new first measurement vector that is associated with the new aggregate and that contains the values of the first characteristic parameters of said new aggregate,
  - deleting the projection of a first measurement vector associated with the aggregate resulting from the combination of the plurality of connection inflows received during the time period located in the first observation time window but outside the second observation time window,
  - projecting the new first vector into at least said sub-space defined by said first characteristic parameters, and
  - determining a new abnormality score depending on the result of said projection;
- provision is made, in the projecting step, to project the plurality of first measurement vectors into a plurality of sub-spaces, and wherein the abnormality score is determined from a sum of abnormality functions, one abnormality function being determined per sub-space depending on the result of said projection of the plurality of first measurement vectors and on the projection of the other first measurement vector and on an average abnormality, the average abnormality also being determined from said projection of the plurality of first measurement vectors and from the projection of the other first measurement vector;
- provision is also made, if the presence of an attack is detected, for the following steps:
  - comparing the abnormality functions determined for all the sub-spaces,
  - selecting at least one sub-space having the highest abnormality function,
  - separating the other aggregate into a plurality of separate connection flows,
  - determining a plurality of identification vectors of the plurality of separate connection flows, the identification vectors containing the same first characteristic parameters as the first measurement vectors,
  - projecting said plurality of identification vectors into said at least one selected sub-space,
  - identifying at least one illegitimate connection flow, said illegitimate connection flow corresponding to the connection flow associated with an abnormal projection of an identification vector, and
  - filtering the illegitimate connection flow;
- a sub-space is defined by a first axis and a second axis, the first axis corresponding to a first characteristic parameter and the second axis corresponding to a second characteristic parameter selected from the first characteristic parameters;
- at least one of the first characteristic parameters comprises one of the following data:
  - the number of connection-flow sources,
  - the average number of connection-flow sources per sub-network,
  - the proportion of transmission requests,
  - the proportion of received error requests,
  - the average size of the received requests,
  - the average lifetime of the received requests; and
- at least one of the other characteristic parameters comprises one of the following data:
  - the hit rate associated with access to a first cache-memory level,
  - the hit rate associated with access to a second cache-memory level,
  - the miss rate associated with access to another cache-memory level, and
  - the proportion of memory used.

The invention also provides a device for filtering attack flows targeting a connectivity module from a plurality of connection inflows, which comprises:

- a module for determining a plurality of aggregates, each aggregate resulting from the combination of the plurality of connection inflows received during a predefined time period, said time period considered to determine each aggregate being different from that considered to determine the other aggregates, and the time periods considered to determine the plurality of aggregates all being comprised in a first observation time window,
- a module for determining a plurality of first measurement vectors that are each associated with one of said aggregates and that contain first characteristic parameters of the aggregate with which it is associated,
- a module for projecting the plurality of first measurement vectors into at least one sub-space defined by said first characteristic parameters,
- a module for determining another aggregate resulting from the combination of a plurality of connection inflows received during another time period, said other time period following the first observation time window, a module for determining another first measurement vector that is associated with the other aggregate and that contains values of first characteristic parameters of the other aggregate, a module for projecting the other first measurement vector into at least one sub-space defined by said first characteristic parameters, a module for determining an abnormality score depending on the result of the projection of the other first measurement vector and of the projection of the plurality of first measurement vectors, a determining module suitable for determining, if the abnormality score is comprised in a zone of doubt as to the presence of attack flows, a plurality of second measurement vectors that are each associated with one of said aggregates and that contain other characteristic parameters of the aggregate with which it is associated, said other characteristic parameters being distinct from said first characteristic parameters, a module for determining another second measurement vector that is associated with the other aggregate and that contains values of other characteristic parameters of the other aggregate, and a module for detecting the presence or absence of an attack by analyzing the other second measurement vector.

DETAILED DESCRIPTION OF ONE EXAMPLE EMBODIMENT

The following description, which is given with reference to the appended drawings, which are given by way of nonlimiting example, will allow a clear understanding of what the invention consists of and how it may be carried out.

Figure 1:
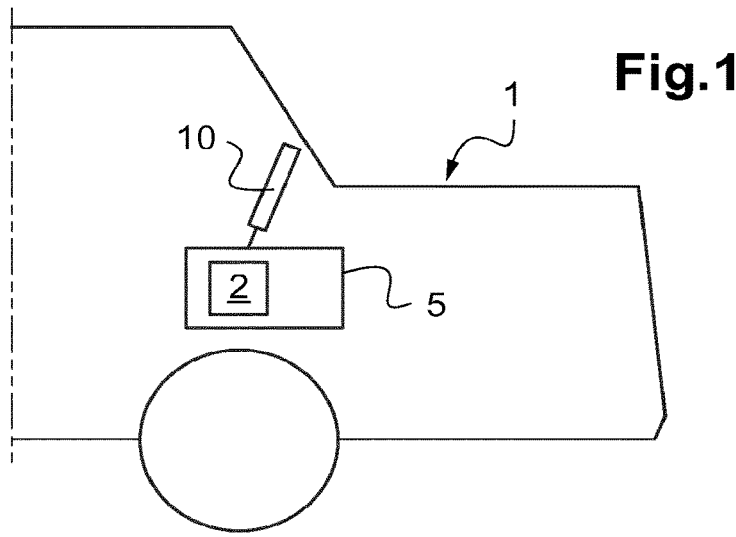
FIG. 1 shows a schematic representation of the passenger compartment of a vehicle equipped with a device for filtering attack flows according to the invention.

FIG. 1 schematically shows the passenger compartment of a motor vehicle 1 equipped with a connectivity module 5 suitable for receiving a plurality of connection flows and with a device 2 for filtering attack flows.

The connection flows may for example come from servers, allowing for example access to the Internet. The connectivity module 5 is for example connected to a multimedia processor 10 of the vehicle 1, thus allowing a broadened multimedia offering to be accessed by an individual present inside the vehicle 1.

The device 2 for filtering attack flows is suitable for analyzing the connection flows received by the connectivity module 5 in order to identify potential attacks. The device 2 for filtering attack flows is also suitable for filtering detected attacks.

As shown in FIG. 1, the device 2 for filtering attack flows is for example included in the connectivity module 5. Alternatively, it may be placed in an entity independent of the connectivity module 5 but in direct communication therewith.

The device 2 for filtering attack flows comprises a set of modules (not shown). These modules may in practice be produced by combining hardware elements and software elements. Each module possesses one of the functionalities described in the method according to the invention and described below.

Figure 2:
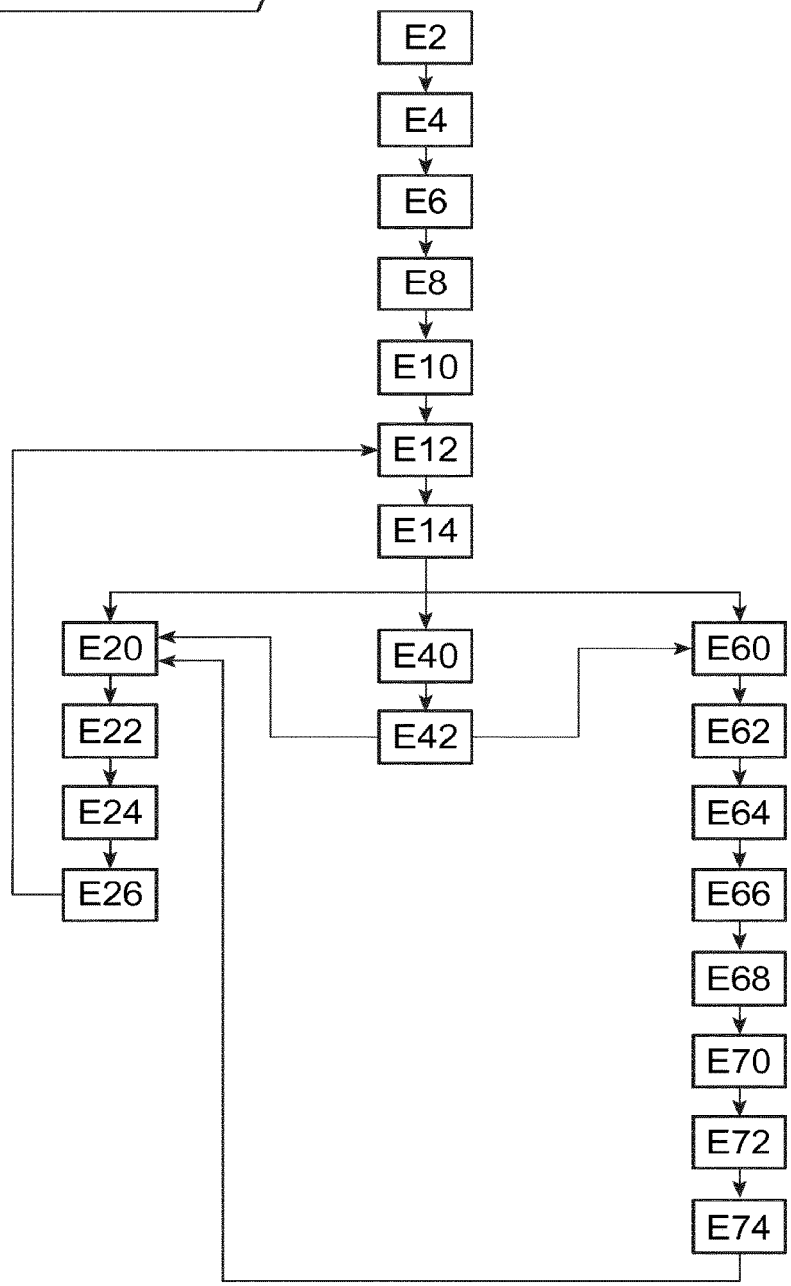
FIG. 2 shows, in the form of a flowchart, a method for filtering attack flows according to invention.

FIG. 2 shows, in the form of a flowchart, an example of a method implemented in the device 2 for filtering attack flows according to the invention.

The method starts in step E2, with reception by the connectivity module 5 of a plurality of connection inflows. These various connection inflows may come from a single source entity (for example a single server) or from a plurality of distinct source entities.

For the rest of the method, a first observation time window $\Delta t$ is defined, in which the steps of the method will be implemented. This first observation time window is for example about 5 s.

This first observation time window is divided into successive time periods $\delta t_i$. In the context of this invention, the time periods $\delta t_i$ are identical. The time period $\delta t_i$ used is for example about 100 milliseconds (the first observation time window therefore consists of 50 successive distinct time periods). The time period $\delta t_i$ corresponds to the time period during which all of the connection inflows are analyzed in order to determine whether a distributed denial-of-service attack is present.

In step E4, all of the connection inflows received during one time period $\delta t_i$ are combined in order to obtain a single flow referred to as an "aggregate". In step E4, one aggregate is therefore obtained per time period (about fifty aggregates are therefore obtained in the entirety of the first observation time window $\Delta t$).

In practice, each connection flow contains a succession of data, in particular data allowing access to the network. Combining all of the connection inflows then consists in grouping all of the data contained in all of the connection flows into a single flow (called an "aggregate" in this description).

An aggregate is defined by way of a first measurement vector containing a plurality of measurements. For example, in a time period $\delta t_i$, the associated first measurement vector $X_i$ is written $X_i=[x_{i,n}]$, with $x_{i,n}$ a variable that corresponds to a measurement n during the time period $\delta t_i$. Each variable $x_{i,n}$ is computed differently depending on the type of studied datum.

For example, the variable $x_{i,n}$ may be evaluated by computing the average of the datum in question over the time period $\delta t_i$. This is for example the case when the average size of the received requests (also conventionally referred to as received IP packets) is obtained by computing the average of the size of all of the received requests for all of the connections during the time period $\delta t_i$.

In the example of the number of sources, the variable $x_{i,n}$ is determined from the number of different source addresses received during the time period $\delta t_i$.

In the example of the average number of sources per sub-network, the variable $x_{i,n}$ is determined from the number of different source addresses received during the time period $\delta t_i$ and from the number of sub-networks (denoted $N_r$ below) among the requests received during the time period $\delta t_i$. In practice, only the 24 first bits of the source address (this source address is denoted IP/24) are considered. Then, for each source address IP/24, the number of different sources and the number of received requests (or received IP packets) are determined. Finally, the average number of sources per sub-network (denoted $N_{s/r}$ in the formula below) is obtained by weighting the number of different sources per source address IP/24 (denoted $N_s$ in the following formula) with the number of received requests per source address IP/24 (denoted $N_P$ in the following formula):

$$N_{s/r} = \frac{\sum_{sub-network\ i} N_s \times N_P}{N_r}$$

As regards the proportion of transmission requests received (which is also referred to as proportion of TCP connection requests, TCP being the acronym of transmission control protocol), the variable $x_{i,n}$ is defined as being the ratio between the number of transmission requests received during the time period $\delta t_i$ and the total number of received requests.

In the example of the proportion of received error requests (which is also referred to as the proportion of packets according to the ICMP protocol, ICMP being the acronym of Internet control message protocol), the variable $x_{i,n}$ is defined as being the ratio between the number of error requests received during the time period $\delta t_i$ and the total number of received requests.

As may be seen in FIG. 2, the method continues in step E6. In this step, for each obtained aggregate (for each time period of the first observation time window), the first measurement vector $X_i$ is determined. This first measurement vector $X_i$ characterises the aggregate with which it is associated by way of characteristic parameters.

These characteristic parameters allow the received Internet communication flows (or IP flows, IP being the commonly used acronym of Internet protocol) to be characterized. These received connection flows in particular depend on the type of connections in course or on the type of data that are transmitted via these connection flows. Among these characteristic parameters, the following are for example distinguished between: the number of sources of connection flows (parameter denoted $x_1$ below), the average number of sources per sub-network (parameter denoted $x_2$), the proportion of data transmission requests (usually determined via the TCP packets, which parameter is denoted $x_3$), the proportion of error control requests (usually called ICMP packets, which parameter is denoted $x_4$), the average size of the transmitted requests (usually determined from the received IP packets, which parameter is denoted $x_5$), the average lifetime of the requests (or IP packets received) during the data transfer (or TTL for time to live) or even the number of sub-networks.

These characteristic parameters are discriminant to allow a distributed denial-of-service attack on a connectivity module to be identified.

Here, the first measurement vector $X_i$ comprises the five parameters denoted $x_1$, $x_2$, $x_3$, $x_4$, $x_5$.

At the end of step E6, a first measurement vector $X_i$ is determined per time period $\delta t_i$ and therefore a plurality of first measurement vectors $X_i$ is obtained in the first observation time window $\Delta t$. Thus, for example, for a time period of 100 ms and a first observation time window of 5 s, 50 first measurement vectors are obtained.

These first measurement vectors $X_i$ are used subsequently in the method in step E8. The characteristic parameters allow projection sub-spaces to be defined. A sub-space is defined as being a grid of cells. For this grid, the first axis, for example the abscissa axis, corresponds to a first characteristic parameter and the second axis, for example the ordinate axis, corresponds to a second characteristic parameter. In practice, the pairwise-selected characteristic parameters allow a plurality of two-dimensional sub-spaces to be defined. As a variant, sub-spaces having more dimensions could also be considered.

Figure 3:
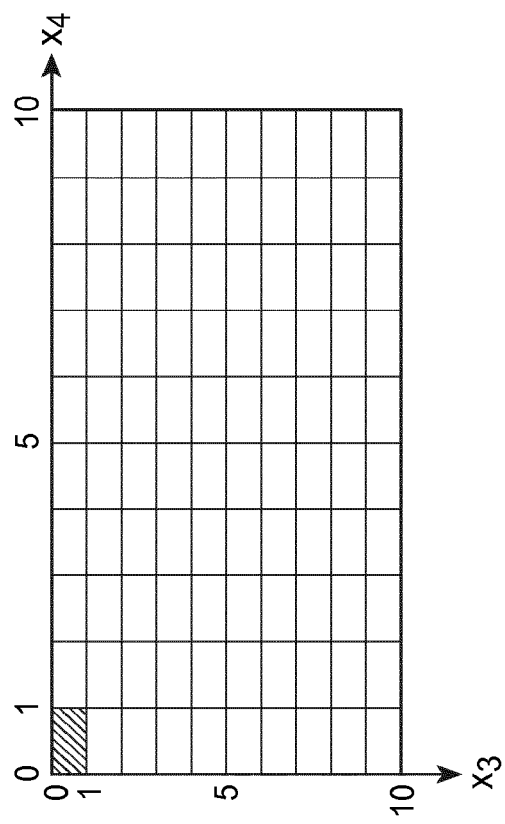
FIGS. 3 to 10 show eight examples of sub-spaces used to implement the method for filtering attack flows shown in FIG. 2.
Figure 4:
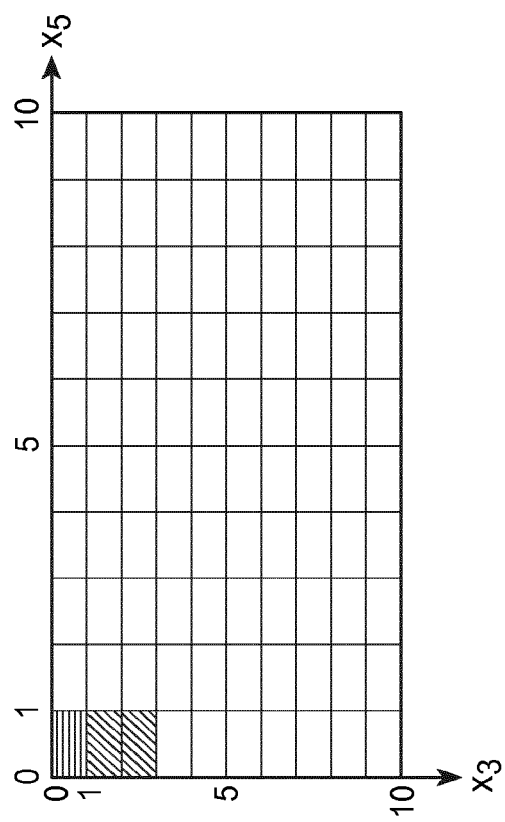
Figure 5:
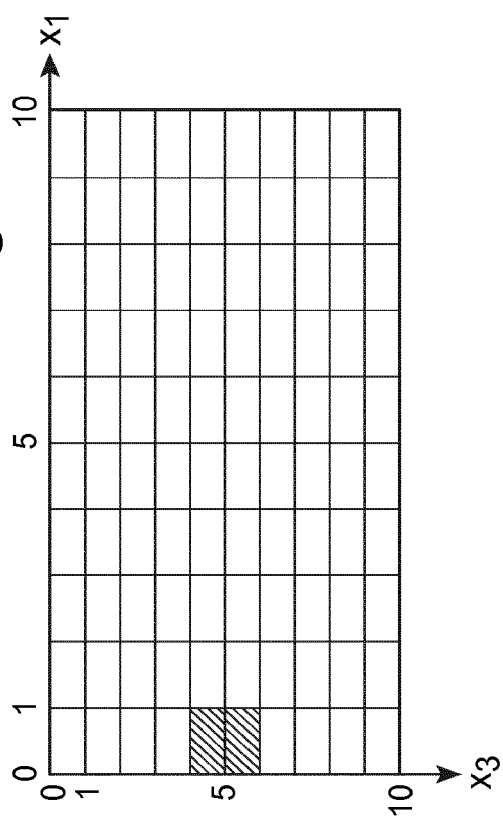
Figure 6:
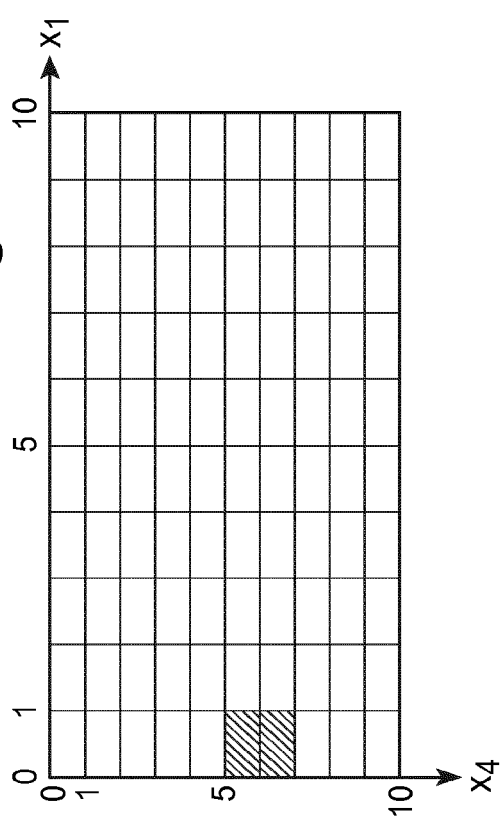
Figure 8:
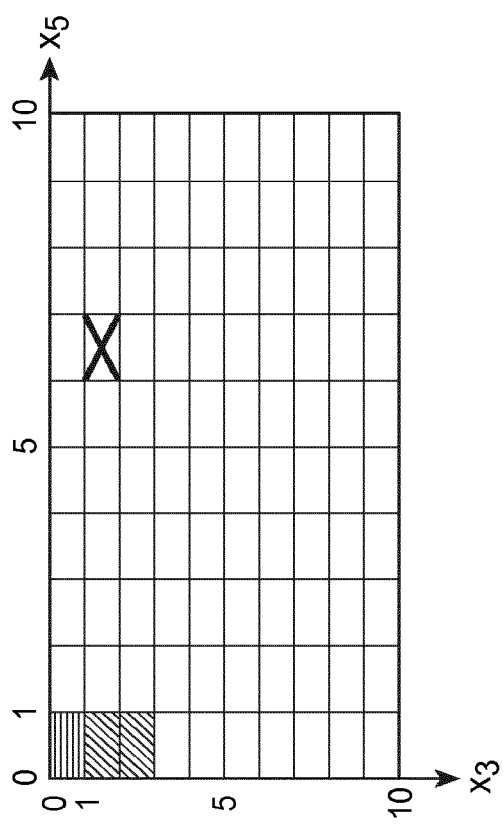
Figure 7:
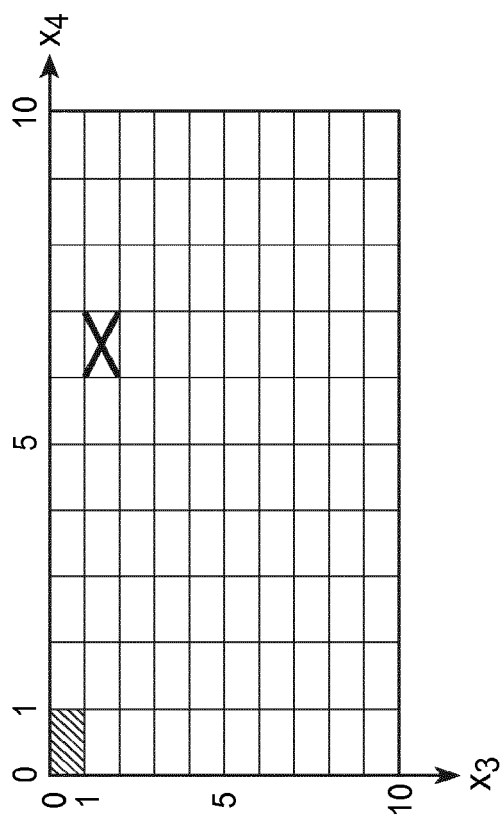
Figure 10:
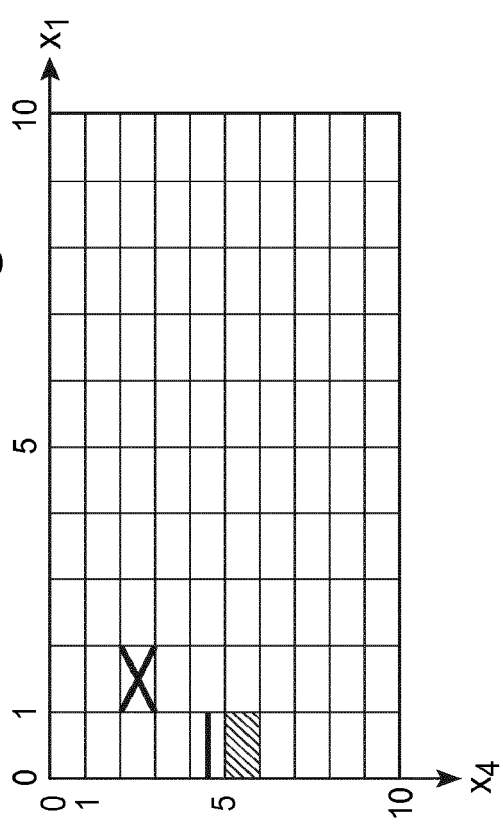
Figure 9:
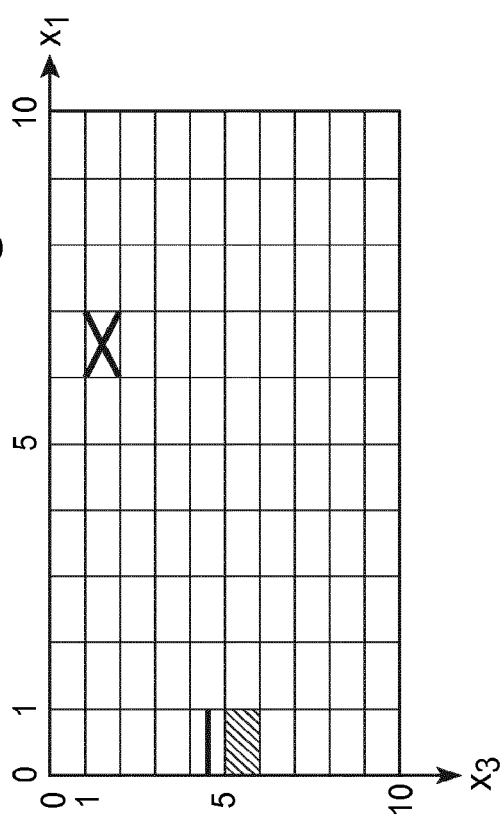

FIGS. 3 to 10 show sub-spaces obtained from the characteristic parameters introduced above. Here, each sub-space is defined as a grid of 10 cells by 10 cells. FIGS. 3 and 7 show for example the sub-space corresponding to the proportion of data transmission requests ($x_3$) as a function of the proportion of error control requests ($x_4$). FIGS. 4 and 8 show the sub-space corresponding to the proportion of data transmission requests ($x_3$) as a function of the average size of the transmitted requests (or received IP packets) ($x_5$). FIGS. 5 and 9 show the sub-space corresponding to the proportion of data transmission requests ($x_3$) as a function of the number of connection-flow sources ($x_1$). FIGS. 6 and 10 show the proportion of error control requests ($x_4$) as a function of the number of connection-flow sources ($x_1$).

In step E8, the first measurement vectors $X_i$ are projected into the sub-spaces defined by the characteristic parameters. All of the first measurement vectors $X_i$ obtained in the first observation time window $\Delta t$ are projected into these sub-spaces. By projection, what is meant is identifying the cell of the grid to which the value of the projected first measurement vector $X_i$ belongs. In other words, for a sub-space defined from two data n and m, the projection corresponds to the identification of the cell of the grid to which the point $(x_{i,n}; x_{i,m})$ of the first measurement vector $X_i$ belongs.

In practice, before the projection, the first measurement vectors $X_i$ are normalised in order to ensure a relevant comparison of the characteristic parameters. Here, each of the characteristic parameters of the first measurement vectors $X_i$ is normalised by a predefined value of the parameter in question. The predefined values used correspond for example to the reasonably maximum values of the characteristic parameters. The notion of "maximum" is defined with respect to the limiting connection flow that a connectivity module present in a motor vehicle may receive. For example, for the average size of the transmitted requests (or received IP packets), which parameter is denoted $x_5$, the value 1500 will be used as normalizing value for the IPv4 version of the IP protocol. The value 8000 will be used as normalizing value for the IPv6 version of the IP protocol.

FIGS. 3 to 10 show examples of projection of first measurement vectors $X_i$ into various sub-spaces for the first observation time window $\Delta t$. At the end of the projections of the first measurement vectors $X_i$, the cells remain empty if no first measurement vector $X_i$ has been projected into the cell in question.

The density of the cells is defined as corresponding to the proportion of first measurement vectors $X_i$ projected into said cells. A cell is said to be dense if the proportion of first measurement vectors $X_i$ projected into it is higher than a predefined proportion. The predefined proportion is for example equal to 5%.

A plurality of adjacent dense cells may define a cluster. By "adjacent cells", what is meant is cells having an edge in common. In FIGS. 3 to 10, the clusters such as defined above are symbolized by cells containing oblique hatching. For example, in FIG. 3, all of the projections of the first measurement vectors $X_i$ into this sub-space are concentrated in a single cell.

Horizontal hatching, which is for example present in FIGS. 4, 8, 9 and 10, symbolizes cells that are not empty but the density of which is lower than the predefined proportion (lower here than 5%). The higher the number of horizontal lines, the higher the density of the cell (while remaining below the predefined proportion).

The crosses present in FIGS. 7 to 10 indicate the presence of an attack (the detection of an attack is described in detail below).

As may be seen in FIG. 2, the method then continues with step E10. In this step, an abnormality score S(X) is determined for each of the sub-spaces into which the first measurement vectors $X_i$ were projected.

In a sub-space (denoted sub-space k below), the abnormality $\alpha(j,k)$ of a point is defined as being the distance between the cell j to which this point belongs and the closest cluster. In other words, the abnormality $\alpha(j,k)$ corresponds to the distance between the cell j and the (or the more than one) closest dense cell(s) (i.e. the proportion of projected first measurement vectors $X_i$ of which is higher than 5%). The computed distance is either the Euclidean distance or the Mahalanobis distance.

In the case where a point is in a cluster, the abnormality $\alpha(j,k)$ is zero. In the case where no cluster is present in the sub-space in question (i.e. no cell for example contains more than 5% of the projected first measurement vectors), the abnormality $\alpha(j,k)$ corresponds to the distance between the cell j and the cell having the highest density (which will however still be lower than 5%) in the sub-space k in question.

From the abnormality $\alpha(j,k)$ defined for each cell j of a sub-space k, it is possible to determine the average abnormality A(k) of all of the cells j of the sub-space k in question. The average abnormality is written:

$$A(k) = \frac{\sum_j \alpha(j,k) \times Dens(j,k)}{n}$$

where $\alpha(j,k)$ corresponds to the abnormality (defined above) of the cell j in the sub-space k, Dens(j,k) corresponds to the density of the cell j in the sub-space k and n is the number of cells in the sub-space k.

According to this definition, the closer the average abnormality A(k) gets to 0, the more the points (corresponding to the projections of the first measurement vectors $X_i$) in the first observation time window $\Delta t$ are distributed in concentric clusters. By way of example, the average abnormality evaluated for the sub-space shown in FIG. 3 is zero since all of the points are distributed in a single cluster. The same goes for the sub-space shown in FIG. 5 and the sub-space of FIG. 6.

In contrast, the higher the average abnormality A(k), the more the points are uniformly distributed over the sub-space in question.

To determine the abnormality score S(X), an abnormality function F(X,k) of a first measurement vector $X_i$ in the sub-space k is introduced:

$$F(X,k) = \frac{\alpha(X_k, k)}{A(k)}$$

where $\alpha(X_k,k)$ is the abnormality of the projection $X_k$ of the first measurement vector $X_i$ into the sub-space k. The average abnormality A(k) here allows the abnormality $\alpha(X_k, k)$ of the projection $X_k$ of the first measurement vector $X_i$ in question in the sub-space k to be normalized (in order to allow all of the sub-spaces to be treated equally).

From these abnormality functions F(X,k), it is possible to define an abnormality score S(X) for the first measurement vector $X_i$ by summing over all of the sub-spaces all of the abnormality functions F(X,k) determined for each sub-space k:

$$S(X) = \sum_k F(X,k).$$

The abnormality score S(X) therefore corresponds to the sum of the abnormality functions F(X,k) obtained for the projections of the first measurement vector $X_i$ into the various sub-spaces.

The method then continues with step E12, in which a new time period $\delta t_{N+1}$ is defined. The new time period $\delta t_{N+1}$ is the time period that immediately follows the first observation time window $\Delta t$.

All of the connection inflows received during the new time period $\delta t_{N+1}$ are combined in order to obtain a new aggregate (using a method similar to that employed in step E4 described above).

A new first measurement vector $X_{N+1}$ contains the characteristic parameters of this new aggregate.

The abnormality score $S(X_{N+1})$ determined for the new first vector $X_{N+1}$ using the method described above is the quantity that will allow the device or method to determine whether attack flows are present or absent among the connection inflows received by the connectivity module 5 during the time window $\delta t_{N+1}$. This abnormality score $S(X_{N+1})$ measures the degree of abnormality of all of the connection flows received during the time period $\delta t_{N+1}$ (and characterized by the new aggregate) with respect to the first observation time window $\Delta t$ (which preceded the time period $\delta t_{N+1}$).

From a graphical point of view, if this abnormality score $S(X_{N+1})$ is high, this means that the projections of the new first measurement vector $X_{N+1}$ into the various sub-spaces differ significantly from the clusters formed during the first observation period $\Delta t$ and identified in the various sub-spaces in step E8. The set of connection flows corresponding to the new aggregate appears suspect and it is necessary to deepen the analysis to confirm or invalidate the presence of an attack.

To do this, in step E14, the abnormality score $S(X_{N+1})$ is compared to a first threshold $th_1$ and to a second threshold $th_2$. The first threshold $th_1$ is lower than the second threshold $th_2$. Three distinct cases are described.

The first case corresponds to an abnormality score $S(X_{N+1})$ lower than the first threshold $th_1$. In this case, the absence of an attack is detected in the new time window $\delta t_{N+1}$ and the method continues with step E20. It is a question of the examples shown in FIGS. 3 to 6, in which all of the projections are concentrated in adjacent cells that are dense or of high density (FIG. 4). In these figures, no isolated value is identified by the computation of the abnormality scores.

In step E20, a second observation time window $\Delta t'$ is defined. This second observation time window $\Delta t'$ corresponds to the first observation time window $\Delta t$ shifted by one time period $\delta t_i$. In other words, the first observation time window $\Delta t$ is a moving window and it is incremented by one time period $\delta t_i$ to define the second observation time window $\Delta t'$. This second observation time window $\Delta t'$ integrates the new first measurement vector $X_{N+1}$. Finally, the two observation time windows therefore have in common a plurality of time periods. The first time period of the first observation time window (called old time period below) is not included in the second observation time window $\Delta t'$. Furthermore, the last time period of the second observation time window $\Delta t'$ (called new time period $\delta t_{N+1}$ above) is not included in the first observation time window $\Delta t$.

In the sub-spaces considered in step E8, the projection of the first measurement vector corresponding to the old time period is deleted in step E22.

In step E24, the new first measurement vector $X_{N+1}$ is projected into these sub-spaces. The clusters present in these sub-spaces are again identified using the method described with reference to step E8. Steps E22 and E24, based on the results obtained beforehand in the method, allow the execution time of the method to be limited. They also allow the computational power (in particular of a processor contained in the device 2 for filtering attack flows) required in the execution of such a method to be limited.

As shown in FIG. 2, the method continues in step E26 with determination of the average abnormalities A(k) once the new first measurement vector $X_{N+1}$ has been projected into all of the sub-spaces in question and once the first measurement vector associated with the old time period has been deleted.

The method is then reiterated again and again starting from step E12.

The second comparison case corresponds to an abnormality score higher than the second threshold $th_2$. In this case, the presence of an attack is detected in the new time period $\delta t_{N+1}$ and the method continues with step E60.

This second case corresponds to the examples shown in FIGS. 7 to 10. The abnormality scores computed for these examples have turned out to be high.

This step E60 allows the abnormality functions F(X,k) determined in step E10 for the new first measurement vector $X_{N+1}$ to be compared.

Among all of the sub-spaces considered, at least two sub-spaces are selected, in step E62. In practice, one or two sub-spaces are selected. It is a question of the sub-spaces with the highest abnormality functions F(X,k). Based on the examination made of these selected sub-spaces, the (or the more than one) attack flow(s) is (or are) then identified in particular using the clusters present in the selected sub-spaces (and that characterize the nominal operating conditions) for the first observation time window $\Delta t$ (preceding the new time period $\delta t_{N+1}$). By way of example, in FIGS. 7 to 10, the clusters are identified by oblique hatching (as described above).

In order to allow the attack flows to be identified, the new aggregate, which is a combination of the plurality of inflows received during the new time period $\delta t_{N+1}$, which inflows were combined to produce this combination in step E12, is decomposed into a plurality of what are referred to as separate connection flows in step E64. All of the connection inflows received during the new time period $\delta t_{N+1}$ by the connectivity module 5 are considered for combining in step E12 with a view to forming the new aggregate. This new aggregate is separated by combining by source address the connection flows received during the new time period $\delta t_{N+1}$. It is therefore possible to define a plurality of separate aggregates that are considered to be suspect. In practice, there are as many separate aggregates as there are source addresses.

In step E66, each of the separate aggregates is characterized by a vector referred to as an identification vector. These identification vectors are constructed from the parameters identified in step E62 by selecting sub-spaces. The identification vectors therefore comprise a small number of parameters with respect for example to the new first measurement vector $X_{N+1}$ defined above. For example, if only the sub-space defined by the parameters $x_3$ and $x_5$ was selected in step E62, the identification vectors will comprise solely these two parameters (these two parameters being determined per separate aggregate during the new time period $\delta t_{N+1}$).

These identification vectors are then projected into the one or more selected sub-spaces, in step E68. When these identification vectors are projected into the cells of the sub-spaces forming a cluster, the associated separate connection flow is not considered to be an attack flow. In contrast, if an identification vector is projected outside of a cluster, the separate aggregate is considered to be an attack.

At the end of this step, the attack is identified in the sub-spaces. In FIGS. 7 to 10, it is symbolized by the cells containing a cross.

By construction, the separate aggregate corresponding to an attack is associated with a set of separate connection flows coming from the same source address. The detection of the separate aggregate corresponding to an attack then allows a source address generating so-called illegitimate connection flows to be identified in step E70.

These illegitimate connection flows are then filtered in step E72 of the method. The filtering is for example carried out by blocking the illegitimate connection flows at the input of the connectivity module 5. In practice, these flows are for example blocked by adding the source address associated with the illegitimate connection flows to the list of blocked source addresses. Any request originating from this source address is then destroyed.

In step E74, once the illegitimate connection flows have been filtered, the separate connection flows are recombined to form what is called a filtered aggregate and an associated filtered first measurement vector $X_f$ is determined. This filtered first measurement vector $X_f$ is projected into all of the sub-spaces in question. Furthermore, as the attack flows have been filtered (attack flows are therefore not detected in the new time period), the method continues with step E20, which was described above (and which corresponds to the rest of the method when no attack has been detected).

The third case of comparison of the abnormality score S(X) to the first threshold $th_1$ and to the second threshold $th_2$ corresponds to an abnormality score S(X) comprised in a zone of doubt. This zone of doubt is defined for an abnormality score S(X) comprised between the first threshold $th_1$ and the second threshold $th_2$. In this case, no conclusion can be reached directly as to the presence or absence of an attack in the new time period $\delta t_{N+1}$. The method then continues with step E40.

In this step E40, for each aggregate obtained in step E4 (for each time period $\delta t_i$ of the first observation time window Lt), a second measurement vector $Y_i$ is determined. This second measurement vector $Y_i$ characterizes the aggregate with which it is associated by way of other characteristic parameters. These other characteristic parameters are distinct from the characteristic parameters associated with the first measurement vectors $X_i$.

These other characteristic parameters this time allow not the IP connection flows but rather the execution of software integrated into the device 2 for filtering attack flows to be characterized. These other characteristic parameters allow in particular the dispersion of the instructions and of the data with respect to the various memory levels included in the device 2 for filtering attack flows to be described. Among these other characteristic parameters, the following are for example distinguished between: the hit rate associated with access to a first cache-memory level (usually measured by the hit rate of the level-1 "data" and "instructions" cache memory), the hit rate associated with access to a second cache-memory level (usually measured by the hit rate of the level-2 unified cache memory), the miss rate associated with a third cache-memory level or even the proportion of memory used.

It is known to use these characteristic parameters to characterize the execution of software on a given processor.

At the end of step E40, one second measurement vector $Y_i$ is determined per time period $\delta t_i$ and therefore a plurality of second measurement vectors $Y_i$ are obtained in the first observation time window $\Delta t$. Thus, for example, for a time period of 100 ms and a first observation time window of 5 s, 50 second measurement vectors are obtained.

These second measurement vectors $Y_i$ are used subsequently in the method in step E42 in which they are analyzed in order to allow the doubt as to the detection of presence or absence of an attack to be removed.

The aim of the analysis of the second measurement vectors $Y_i$ is to detect abnormal operations in the execution of the software.

In the same way as for the first measurement vector $X_i$, in step E6, the second measurement vectors $Y_i$ are projected into two-dimensional sub-spaces. It is also possible to identify clusters and to determine one other average abnormality per sub-space B(k) (on the same principle as the determination of the average abnormality A(k)).

When the preceding steps of the method identify a doubt as to the presence of an attack during the new time period $\delta t_{N+1}$ on the basis of the analysis of the new first vector $X_{N+1}$, another abnormality score $S(Y_{N+1})$, for a new second measurement vector $Y_{N+1}$ associated with the new time period $\delta t_{N+1}$, is computed using the method described above.

This other abnormality score $S(Y_{N+1})$ is then compared to a third threshold $th_3$. If the other abnormality score $S(Y_{N+1})$ is higher than the third threshold $th_3$, the presence of an attack during the new time period $\delta t_{N+1}$ is confirmed.

As shown in FIG. 2, following this step E42, if the absence of an attack is detected, the method continues with step E20 described above. In the case where, at the end of the analysis of the second measurement vectors, the presence of an attack was detected, the method continues with step E60 described above.

The invention claimed is:

1. A method for filtering attack flows targeting a connectivity module receiving a plurality of connection inflows, the method comprising:
    determining a plurality of aggregates, each aggregate resulting from a combination of the plurality of connection inflows received during a predefined time period, said time period considered to determine each aggregate being different from that considered to determine other aggregates, and time periods considered to determine the plurality of aggregates all being comprised in a first observation time window;
    determining a plurality of first measurement vectors that are each associated with one of said aggregates and that contain values of first characteristic parameters of the one of said aggregates with which it is associated;
    projecting the plurality of first measurement vectors into at least one sub-space defined by said first characteristic parameters;
    determining another aggregate resulting from a combination of a plurality of connection inflows received during another time period, said another time period following the first observation time window;
    determining another first measurement vector that is associated with the another aggregate and that contains values of first characteristic parameters of the another aggregate;
    projecting the another first measurement vector into at least one sub-space defined by said first characteristic parameters, wherein a sub-space is a grid of cells defined by a first axis and a second axis, the first axis corresponding to a one of the first characteristic parameters and the second axis corresponding to a second one of the first characteristic parameters;
    determining an abnormality score depending on the result of the projection of the another first measurement vector and of the projection of the plurality of first measurement vectors, wherein the abnormality score corresponds to a distance between (i) a cell within the at least one sub-space to which the first measurement vector is projected and (ii) one or more closest dense cells in the subspace where a proportion of the projection of the plurality of first measurement vectors is higher than a predetermined percentage; and
    comparing the abnormality score to a first threshold and to a second threshold,
    wherein
        when the abnormality score is higher than the second threshold, the presence of an attack is detected in the another time period,
        when the abnormality score is lower than the first threshold, the absence of an attack is detected in the another time period,
        when the abnormality score is between the first threshold and the second threshold then the abnormality score is in a zone of doubt as to a presence of attack flows and the following steps are performed:
            determining a plurality of second measurement vectors that are each associated with one of said aggregates and that contain values of other characteristic parameters of the aggregate with which it is associated, said other characteristic parameters being different from said first characteristic parameters,
            determining another second measurement vector that is associated with the another aggregate and that contains values of other characteristic parameters of the another aggregate, and
            detecting the presence or absence of an attack by analyzing the another second measurement vector.

2. The method for filtering attack flows as claimed in claim 1, further comprising:
    defining a second observation time window, said second observation time window corresponding to the first observation time window shifted by said other time period;
    determining a new aggregate, the new aggregate resulting from a combination of a plurality of connection inflows received during a new time period, said new time period following the second observation time window;
    determining a new first measurement vector that is associated with the new aggregate and that contains the values of the first characteristic parameters of said new aggregate;
    deleting the projection of the first measurement vector associated with the aggregate resulting from the combination of the plurality of connection inflows received during the time period located in the first observation time window but outside the second observation time window;

projecting a new first vector into at least said one sub-space defined by said first characteristic parameters; and determining a new abnormality score depending on a result of said projection of the new first vector into the at least said one sub-space.

3. The method for filtering attack flows as claimed in claim 1, wherein provision is made to project the plurality of first measurement vectors into a plurality of sub-spaces, and wherein the abnormality score is determined from a sum of abnormality functions, each abnormality function of the abnormality functions being determined per sub-space depending on the result of said projection of the plurality of first measurement vectors and on the projection of the another first measurement vector and on an average abnormality, the average abnormality also being determined from said projection of the plurality of first measurement vectors and from the projection of the another first measurement vector.

4. The method for filtering attack flows as claimed in claim 3, further comprising, when the presence of an attack is detected, the following:

comparing the abnormality functions determined for all the sub-spaces;

selecting at least one sub-space having a highest abnormality function;

separating the another aggregate into a plurality of separate connection flows;

determining a plurality of identification vectors of the plurality of separate connection flows, the identification vectors containing the same first characteristic parameters as the first measurement vectors;

projecting said plurality of identification vectors into said at least one selected sub-space;

identifying at least one illegitimate connection flow, said illegitimate connection flow corresponding to the connection flow associated with an abnormal projection of an identification vector; and filtering the illegitimate connection flow.

5. The method for filtering attack flows as claimed in claim 1, wherein at least one of the first characteristic parameters comprises one of following data:

a number of connection-flow sources;

an average number of connection-flow sources per sub-network;

a proportion of transmission requests;

a proportion of received error requests;

an average size of the received error requests; and an average lifetime of the received error requests.

6. The method for filtering attack flows as claimed in claim 1, wherein at least one of the another characteristic parameters comprises one of following data:

a hit rate associated with access to a first cache-memory level;

a hit rate associated with access to a second cache-memory level;

a miss rate associated with access to another cache-memory level; and a proportion of memory used.

7. A device for filtering attack flows targeting a connectivity module from a plurality of connection inflows, comprising:

processing circuitry configured to determine a plurality of aggregates, each aggregate resulting from a combination of the plurality of connection inflows received during a predefined time period, said time period considered to determine each aggregate being different from that considered to determine other aggregates, and time periods considered to determine the plurality of aggregates all being comprised in a first observation time window;

determine a plurality of first measurement vectors that are each associated with one of said aggregates and that contain values of first characteristic parameters of the one of said aggregates with which it is associated;

project the plurality of first measurement vectors into at least one sub-space defined by said first characteristic parameters, wherein a sub-space is a grid of cells defined by a first axis and a second axis, the first axis corresponding to a one of the first characteristic parameters and the second axis corresponding to a second one of the first characteristic parameters;

determine another aggregate resulting from a combination of a plurality of connection inflows received during another time period, said another time period following the first observation time window;

determine another first measurement vector that is associated with the another aggregate and that contains values of first characteristic parameters of the another aggregate;

project the another first measurement vector into at least one sub-space defined by said first characteristic parameters;

determine an abnormality score depending on the result of the projection of the another first measurement vector and of the projection of the plurality of first measurement vectors, wherein the abnormality score corresponds to a distance between (i) a cell within the at least one sub-space to which the first measurement vector is projected and (ii) one or more closest dense cells in the subspace where a proportion of the projection of the plurality of first measurement vectors is higher than a predetermined percentage; and compare the abnormality score to a first threshold and to a second threshold, wherein when the abnormality score is higher than the second threshold, the presence of an attack is detected in the another time period, when the abnormality score is lower than the first threshold, the absence of an attack is detected in the another time period, when the abnormality score is between the first threshold and the second threshold then the abnormality score is in a zone of doubt as to a presence of attack flows and the processing circuitry is configured to:

determine a plurality of second measurement vectors that are each associated with one of said aggregates and that contain values of other characteristic parameters of the aggregate with which it is associated, said other characteristic parameters being different from said first characteristic parameters, determine another second measurement vector that is associated with the another aggregate and that contains values of other characteristic parameters of the another aggregate, and detect the presence or absence of an attack by analyzing the another second measurement vector.

* * * * *